United States Patent Office 3,804,906
Patented Apr. 16, 1974

3,804,906
OXIDATION OF ORGANIC COMPOUNDS
James McAvoy, Norton-on-Tees, England, assignor to Imperial Chemical Industries Limited, London, England
No Drawing. Continuation of application Ser. No. 654,718, July 20, 1967. This application Dec. 8, 1969, Ser. No. 878,980
Claims priority, application Great Britain, July 25, 1966, 33,362/66
Int. Cl. C07c 37/00
U.S. Cl. 260—621 G  9 Claims

ABSTRACT OF THE DISCLOSURE

There is provided a process for producing a phenol from an aromatic hydrocarbon by contacting the hydrocarbon in the liquid phase with hydrogen and oxygen in the presence of a compound of a transition metal and a catalyst comprising noble metal of Group VIII of the Periodic Table at temperatures from 10° to 100° C. and at hydrogen/oxygen ratios of 1:100 to 100:1.

---

This application is a continuation of application Ser. No. 654,718, now abandoned.

This invention relates to the oxidation of aromatic hydrocarbons.

According to the invention there is provided a process for the oxidation of an aromatic hydrocarbon to a phenol in which the aromatic hydrocarbon is brought into contact in a liquid phase with hydrogen and oxygen in the presence of a redox system, a compound of a transition metal and a catalyst comprising a compound of a noble metal of Group VIII of the Periodic Table.

The aromatic hydrocarbon may be for example, benzene or an alkyl substituted benzene such as toluene. The process of the invention is particularly applicable to the oxidation of benzene to phenol.

The compound of a noble metal of Group VIII of the Periodic Table should be at least partly soluble in the liquid phase. It may be a halide such as platinum chloride, palladous chloride, ruthenium chloride or rhodium chloride or a complex compound of the type $IrL_nX_3$ or $RhL_3X$ where $n=2$ or 3, L is a tertiary phosphine or arsine, and X is an anion such as hydrogen or chlorine. The compound of a noble metal may also be a compound of platinum of the type $Pt(PR_3)_4$ where R is an alkyl or aryl group, very suitably a phenyl group. The preferred catalyst comprises a compound of platinum, very suitably a halide, especially a chloride. It is also preferred that the catalyst comprises a compound of tin for example, a halide, especially a chloride, in addition to the compound of a noble metal of Group VIII of the Periodic Table. The compound of tin and the compound of the Group VIII noble metal may be in the form of a complex compound.

Suitable transition metals are for example, tungsten, molybdenum, vanadium and chromium. The transition metal may also be a noble metal of Group VIII of the Periodic Table which is different from the noble metal of Group VIII provided in the catalyst. For example, the transition metal may be ruthenium and the noble metal of the catalyst may be platinum.

The transition metal compound may be for example, an oxide, a carbonyl or a salt such as a carboxylate, for example an acetate, stearate or naphthenate. The compound may also be a complex or the transition metal, for example, an acetylacetonate, or an acid, for example, molybdic acid, phosphomolybdic acid or tungstic acid in which the transition metal is present in the anion. Salts of these acids, for example, the alkali or alkaline earth metal salts may be used while the acid may be a heteropoly or an isopoly acid. The transition metal compound should be at least partly soluble in the liquid phase.

Suitable redox systems are provided by a metal salt soluble in the liquid phase, such as a halide, particularly a chloride, or a carboxylate, particularly an acetate. Examples of suitable metal salts are ferric, manganic and cupric salts. A preferred redox system is provided by an iron salt, preferably a carboxylate and more preferably an acetate. A more preferred redox system is provided by the transition metal compound, very suitably a compound of molybdenum, and in this case a separate redox system is unnecessary. If the redox system is provided by a compound of molybdenum it is desirable to react it firstly with hydrogen and oxygen in the presence of a compound of a noble metal of Group VIII of the Periodic Table and then to add the aromatic hydrocarbon to the reaction mixture so formed.

An alkali metal halide such as lithium chloride is preferably also present in the liquid phase.

The liquid phase preferably contains a solvent for the reactants such as a carboxylic acid, preferably acetic acid, or an ester such as ethyl acetate.

The temperature at which the process is carried out is preferably within the range 10° to 100° C., but temperatures outside this range may be used. The pressure should be at least sufficient to maintain a liquid phase.

The hydrogen and/or oxygen may be diluted with a gas such as nitrogen which is inert under the conditions of the process. The ratio of hydrogen to oxygen by volume may be within the range 1:100 to 100:1.

It is a feature of the invention to provide a catalyst system suitable for the oxidation of aromatic hydrocarbons to phenols which comprises a redox system, a compound of a transition metal and a compound of a noble metal of Group VIII of the Periodic Table in a liquid phase. The liquid phase may be provided by a carboxylic acid, preferably acetic acid, or an ester such as ethyl acetate. As previously indicated it is preferred that the transition metal is molybdenum and that the molybdenum compound provides the redox system. It is also preferred that the noble metal of Group VIII is a platinum and that the catalyst system also comprises a compound of tin. The compounds of tin and the Group VIII metal are very suitably the halides, especially the chlorides.

The invention is illustrated in the following examples.

EXAMPLE 1

0.208 gram platinuous chloride, 1.02 gram stannous chloride 0.407 gram lithium chloride and 1.88 gram of dodecamolybdophosphoric acid were dissolved in 180 mls. of glacial acetic acid and a mixture of 2 liters per hour of hydrogen and 30 liters per hour of oxygen passed through the solution maintained at 50° C. for 3 hours. Gas was absorbed initially at a rate of about 4 cc. per minute increasing to 50 cc. per minute after 2 hours, and thereafter maintaining that rate of absorption.

20 mls. of benzene was then added and the rate of gas absorption fell to 20 cc. per minute. After 3 hours, 0.006 gram of phenol was formed; a yield of 95% on benzene.

EXAMPLE 2

0.208 gram platinuous chloride, 102 gram stannous chloride, and 1.88 gram of dodecamolybdophosphoric acid were disolved in 180 mls. of ethyl acetate, and a mixture of 2 liters per hour of hydrogen and 30 liters per hour of oxygen passed through the solution maintained at 50° C. for 4 hours. Gas was absorbed initially at a rate of about 2 cc. per minute, increasing to about 15 cc. per minute after 3 hours and thereafter maintaining that rate of absorption.

20 mls. of benzene was then added and the rate of gas absorption remained steady at 15 cc. per minute. After 5 hours, 0.0014 gram of phenol was formed, a yield of more than 95% on benzene.

I claim:

1. A process for the oxidation of an aromatic hydrocarbon to a phenol in which the aromatic hydrocarbon which is selected from mono-substituted lower alkyl benzenes and benzene is brought into contact in a liquid phase containing a solvent selected from the group consisting of acetic acid and ethyl acetate, with hydrogen and oxygen at temperatures between 10° C. and 100° C. and the ratio of hydrogen to oxygen by volume being between 1:100 and 100:1 in the presence of an oxide, carbonyl, carboxylate or acetylacetonate of a transition metal selected from the group consisting of molybdenum, tungsten, vanadium and chromium and an isopoly or heteropoly acid of said transition metals and an alkali or alkaline earth metal salt of said acid, a halide of tin, a halide of a noble metal of Group VIII of the Periodic Table, or a compound which is the complex $IrL_nX_3$ or $RhL_3X$ where $n$ is 2 or 3, L is tertiary phosphine or arsine and X is an anion of hydrogen or chlorine, the said compounds being at least partly soluble in the said solvent.

2. A process as claimed in claim 1 in which the aromatic compound is selected from benzene and toluene.

3. A process as claimed in claim 2 in which the compound of a noble metal of Group VIII of the Periodic Table is a compound of platinum.

4. A process as claimed in claim 3 in which the compound of platinum is a chloride.

5. A process as claimed in claim 3 in which the process has a redox system provided by an iron salt included therein.

6. A process as claimed in claim 5 in which the iron salt is an acetate.

7. A process as claimed in claim 1 in which the process has a redox system provided by the transition metal compound.

8. A process as claimed in claim 7 in which the transition metal is molybdenum.

9. A process as claimed in claim 1 in which an alkali metal halide is present in the reaction mixture.

References Cited

UNITED STATES PATENTS

| | | | |
|---|---|---|---|
| 3,361,533 | 2/1968 | Hooper | 23—207 |
| 3,122,586 | 2/1964 | Berndt et al. | 260—586 B |

BERNARD HELFIN, Primary Examiner

N. MORGENSTERN, Assistant Examiner